May 14, 1963 K. J. WILLIS 3,089,342
MECHANICAL-SYSTEM FOR ACCELEROMETERS AND THE LIKE
Filed Jan. 11, 1961 2 Sheets-Sheet 1

INVENTOR
Kenneth James Willis,
BY
Pierce, Scheffler & Parker
ATTORNEYS

May 14, 1963 K. J. WILLIS 3,089,342
MECHANICAL-SYSTEM FOR ACCELEROMETERS AND THE LIKE
Filed Jan. 11, 1961 2 Sheets-Sheet 2

INVENTOR
Kenneth James Willis,
BY
Pierce, Scheffler & Parker
ATTORNEYS

United States Patent Office 3,089,342
Patented May 14, 1963

3,089,342
MECHANICAL-SYSTEM FOR ACCELEROMETERS
AND THE LIKE
Kenneth James Willis, Pinner, England, assignor to
J. Langham Thompson Limited
Filed Jan. 11, 1961, Ser. No. 81,999
Claims priority, application Great Britain Jan. 13, 1960
6 Claims. (Cl. 73—514)

The present invention relates to mechanical systems and particularly to spring suspension systems for suspending a body by means of springs so that it presents a high compliance for displacement in a desired direction while offering low compliance for displacement in directions at an angle to the desired direction. Such systems are particularly applicable to instruments such as accelerometers which are required to respond to forces acting along the sensitive axis of the instrument but to be largely irresponsive to forces transverse of the axis.

The invention consists broadly of a mechanical system comprising a body mounted for displacement in a predetermined direction with respect to a support by means of a suspension system having two sets of resilient members, the two sets joining the body to the support at two regions of the body spaced along the said predetermined direction and each resilient member of one set having a corresponding member of the other set to which it is rigidly joined at a fixture point between the body and the support by a connecting piece disposed parallel to the predetermined direction, the connecting pieces joining corresponding resilient members being flexibly coupled together to form a secondary system giving the body a high compliance for displacement in the predetermined direction but a low compliance for displacement at an angle to the predetermined direction.

Other features and advantages of the invention will be apparent from the following description, given by way of example only, of one embodiment thereof as applied to an accelerometer, reference being made to the accompanying drawings in which.

Figure 1:
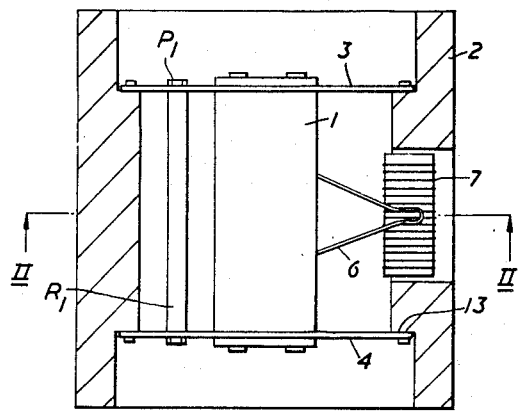
FIGURE 1 is a sectional elevation of the accelerometer.
Figure 2:
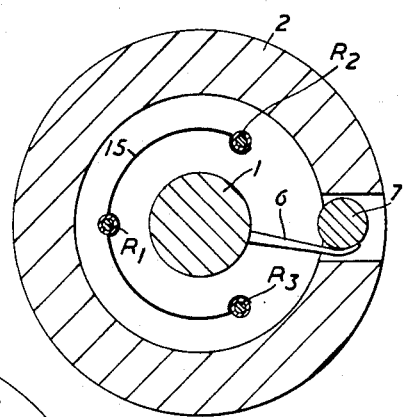
FIGURE 2 is a section on the line II—II of FIGURE 1.

Referring more particularly to FIGURES 1 and 2, a seismic mass 1 of cylindrical shape is supported in an annular housing 2 by a suspension system which includes two suspension spirngs 3, 4. The mass 1 is displaced with respect to the housing 2 by an acceleration, or component of acceleration, acting along the direction of the central axis as indicated at 5, and this displacement causes a potentiometer wiper 6 attached to the mass 1 to move along a potentiometer resistance winding 7 fixed to the housing 2.

Figure 3:
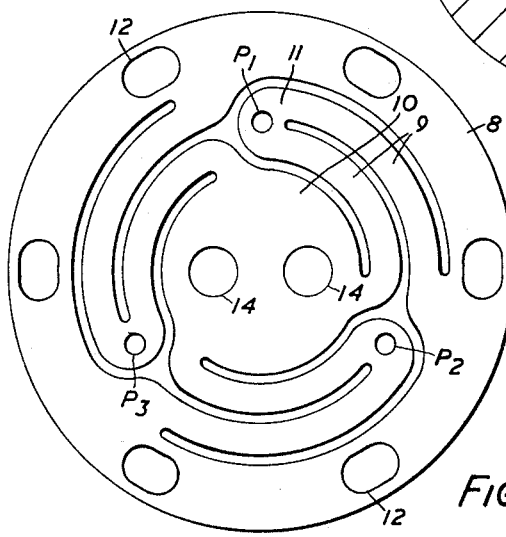
FIGURE 3 is an enlarged plan of one of the two suspension springs employed in the suspension system of the accelerometer.

As shown in FIGURE 3, suspension springs 3 and 4, in the unstressed condition, each consists of a plane disc of spring metal cut, or conveniently milled by chemical milling, to form an outer annulus 8 connected by equally spaced double arms 9 to a central portion 10. The three double arms 9 have elbows 11 with fixture points designated respectively $P_1$, $P_2$ and $P_3$. The outer annulus 8 of the suspension spring is secured by bolts passing through holes 12 to an inwardly projecting shoulder 13 of the housing 2, and the central portion 10 is attached by bolts passing through holes 14, to the respective ends of the mass 1.

The two suspension springs 3, 4 are fixed in position in the same sense i.e. so that identical parts have contours falling along lines parallel with the axis of the instrument, and rods $R_1$, $R_2$ and $R_3$ rigidly joining corresponding fixture points $P_1$, $P_2$ and $P_3$ of the springs are parallel to the central axis (FIGURES 1 and 2). The three parallel rods $R_1$, $R_2$ and $R_3$ are themselves joined through a flexible part-cylindrical spring 15 extending substantially along the length of the rods.

Each of the suspension springs 3, 4 is thus equivalent to three cantilever springs spaced 120° apart joining the mass 1 and the housing 2, a secondary system comprising the rods $R_1$, $R_2$ and $R_3$ and the flexible spring 15 joining corresponding points $P_1$, $P_2$ and $P_3$ approximately midway along the cantilevers of the two suspension springs. This secondary system, which allows the points $P_1$, $P_2$ and $P_3$ to be displaced in response to a force at an angle to the sensitive axis 5 in FIGURE 1 while constraining corresponding points in the two suspension springs 3, 4 to be displaced similarily, provides a high transverse stiffness in the instrument so that errors due to acceleration forces acting at right angles to the sensitive axis are minimised.

Figure 4:
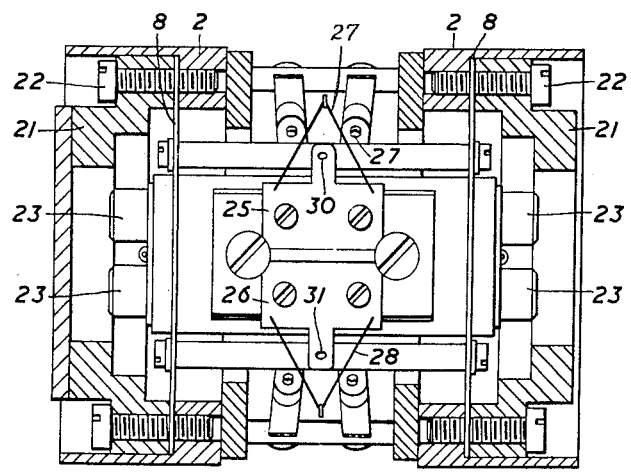
FIGURE 4 is a part -ectional view of a practical form of the invention.
Figure 5:
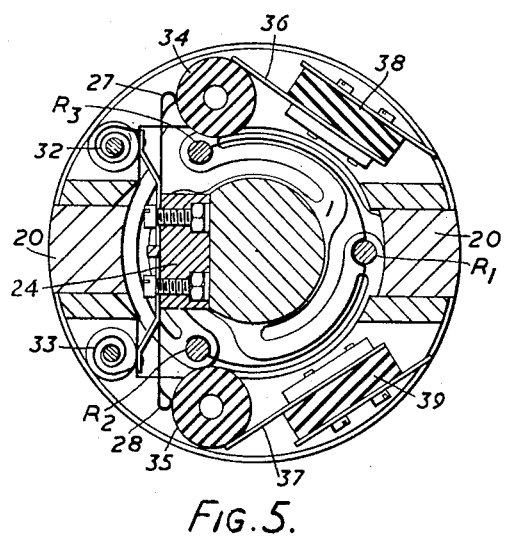
FIGURE 5 is a sectional view taken on the line 5—5 of FIGURE 4.

A practical form of the arrangement described is shown in FIGURES 4 and 5. In these various figures, like parts bear like reference numerals.

This transducer includes a yoke 2 of generally hollow, cylindrical form with two lateral cut away portions, as shown in FIGURE 5, having bridges 20. The two end springs, each as shown in FIGURE 3, are clamped against shoulders 13 by clamping rings 21 and bolts 22. The seismic mass 1 is held to the springs by bolts 23, and rods $R_1$, $R_2$ and $R_3$ extend between the springs as described above. Said rods are constrained by spring 15, so as to move always in the same direction parallel to the sensitive axis of the accelerometer (e.g. from left to right in FIG. 4 whilst permitting these rods to move relatively in the radial direction of the axis.

Fastened to mass 1 is a block 24 carrying two wiper arm plates 25, 26 carrying wipers 27, 28. Connection is made to plates 25, 26 by lugs 30, 31 fastened respectively to hair springs 32, 33. The wiper arms cooperate with resistances wound on formers 34, 35 disposed in the cut-away part of the yoke. Two fixed connections are made to each resistance by contact blades 36, 37 carried by insulating support blocks 38, 39. The operation of the device will be apparent from the foregoing: when the mass 1 moves relative to the yoke in response to acceleration (or deceleration) the wiper arms 27, 28 will move over the respective resistances.

It is advantageous if the seimic mass 1 is totally immersed in a damping medium such as a silicone fluid and a sealed capsule inside the accelerometer case used to compensate for changes in fluid volume with temperature. In an accelerometer made in accordance with the embodiment described above and designed to measure acceleration forces in the range ±5 g it was found that the maximum error due to a transverse force of 30 g was less than 3%. For higher ranges, this error progressively decreases.

I claim:

1. A mechanical system comprising a support and a body mounted for sensitive movement in response to small accelerations of said support along a predetermined axis in said support, said body being mounted by means including first and second sets of resilient members, said sets each comprising arms lying in a general plane at right angles to said axis and extending between points respectively on said support and said body that are spaced radially of said axis, said arms each having portions of their length that have arcuate extent about said axis, said arms being relatively compliant for movement of said body in the direction of said axis and substantially less compliant for movement in directions radial of said axis, and a plurality of tie means extending between the respective and corresponding arcuate portions of said arms intermediate of their lengths, said tie means being relatively rigid in the direction parallel to said axis, said system further comprising constraining means linking all said tie means and being substantially less compliant for relative movement of the individual members of the tie means in a direction generally parallel to said axis than for relative movement in directions at right angles to said axis.

2. A mechanical system as defined in claim 1, said constraining means including a member connected at separated regions thereon to said tie means, said constraining means having a low compliance for relative movement of said regions in directions parallel to said axis and relatively high compliance for relative movement of said regions radial of said axis.

3. A mechanical system as defined in claim 2, wherein said member is of thin resilient sheet material, said sheet extending arcuately about said axis, said regions lying parallel to said axis.

4. A mechanical system comprising a support and a body mounted for sensitive movement in response to minute accelerations of said support along a predetermined axis in said support, said body being mounted by means including first and second sets of resilient members said sets being similar and each comprising arms lying in a general plane at right angles to said axis and extending between points respectively on said support and said body that are spaced radially of said axis, said arms each having portions of their length that have arcuate extent about said axis said arms being relatively compliant for movement of said body in the direction of said axis and substantially less compliant for movement in directions radial of said axis, and tie means extending between more than two pairs of points on said respective arcuate portions of said arms to constrain corresponding arms of said sets to move together in the same direction generally parallel to said axis, said tie means being disposed at substantially uniform angular intervals around said axis, said system further comprising constraining means linking all said tie means and being substantially less compliant for relative movement of the individual members of the tie means in a direction generally parallel to said axis than for relative movement in directions at right angles to said axis.

5. A mechanical system as defined in claim 4 said constraining means including a member connected at separated regions thereon to said tie means said constraining means having a low compliance for relative movement of said regions in directions parallel to said axis and relatively high compliance for relative movement of said regions radial of said axis.

6. A mechanical system as defined in claim 5, wherein said regions lie parallel to said axis and wherein said member is of thin resilient sheet material, said sheet extending arcuately about said axis.

References Cited in the file of this patent

UNITED STATES PATENTS

| | | |
|---|---|---|
| 2,387,223 | Carson | Oct. 16, 1945 |
| 2,767,973 | Ter Veen | Oct. 23, 1956 |
| 2,949,026 | Gindes | Aug. 16, 1960 |

FOREIGN PATENTS

| | | |
|---|---|---|
| 667,507 | Germany | Nov. 12, 1938 |